United States Patent
Yu et al.

(10) Patent No.: US 7,839,760 B2
(45) Date of Patent: Nov. 23, 2010

(54) TRANSMITTING AND RECEIVING SYSTEMS FOR INCREASING SERVICE COVERAGE IN ORTHOGONAL FREQUENCY DIVISION MULTIPLEXING WIRELESS LOCAL AREA NETWORK, AND METHOD THEREOF

(75) Inventors: Hee-Jung Yu, Daejeon (KR); Eun-Young Choi, Daejeon (KR); Chan-Ho Yoon, Seoul (KR); Jung-Bo Son, Masan (KR); Il-Gu Lee, Seoul (KR); Deuk-Su Lyu, Daejeon (KR); Tae-hyun Jeon, Sungnam (KR); Seung-Wook Min, Seoul (KR); Sok-Kyu Lee, Daejeon (KR); Seung-Chan Bang, Daejeon (KR); Seung-Ku Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 859 days.

(21) Appl. No.: 11/635,927

(22) Filed: Dec. 8, 2006

(65) Prior Publication Data
US 2007/0115802 A1    May 24, 2007

(30) Foreign Application Priority Data
Dec. 9, 2005  (KR) .................. 10-2005-0120849
Jun. 2, 2006  (KR) .................. 10-2006-0049871

(51) Int. Cl.
*H04J 9/00* (2006.01)
(52) U.S. Cl. .................. 370/204; 370/208; 370/210
(58) Field of Classification Search .......... 370/208, 370/204, 210
See application file for complete search history.

(56) References Cited

U.S. PATENT DOCUMENTS 6,074,086 A * 6/2000 Yonge, III .................. 708/422
7,366,250 B2 * 4/2008 Mujtaba et al. ............. 375/267

(Continued)

FOREIGN PATENT DOCUMENTS

KR    1020040077567        4/2004

(Continued)

OTHER PUBLICATIONS

You, Y.H., et al., "Simple Construction of OFDM Signals with Diversity Gain and Low PAPR", Jan. 20, 2005, *Electronics Letters*, vol. 41, No. 2.

*Primary Examiner*—Ricky Ngo
*Assistant Examiner*—Luat Phung
(74) *Attorney, Agent, or Firm*—Ladas & Parry LLP (57) ABSTRACT

The present invention relates to an orthogonal frequency division multiplexing wireless local area network (LAN) transmitting/receiving system for providing expanded service coverage, and a method thereof. A first OFDM modulation is performed for an even-numbered time, and a second OFDM modulation is performed for an odd-numbered time. A transmitting frame including a plurality of signal fields according to the first and second OFDM modulation is transmitted. The receiving system determines whether a signal field is repeatedly generated in the frame. If the signal field is not repeatedly generated, corresponding demodulation is performed. If repeatedly performed, the signal field is demodulated by using first bit allocation information and second bit allocation information having a ½ value of the first bit allocation information. A data field is demodulated according to the demodulated signal field.

8 Claims, 9 Drawing Sheets

U.S. PATENT DOCUMENTS

| | | | |
|---|---|---|---|
| 2002/0172147 A1* | 11/2002 | Matsumoto | 370/208 |
| 2004/0165564 A1 | 8/2004 | Kim et al. | |
| 2004/0190440 A1 | 9/2004 | Kim et al. | |
| 2005/0201347 A1 | 9/2005 | Abhishek et al. | |
| 2006/0062317 A1* | 3/2006 | Chang et al. | 375/260 |
| 2006/0120473 A1* | 6/2006 | Baum | 375/260 |

FOREIGN PATENT DOCUMENTS

| | | |
|---|---|---|
| KR | 1020040001354 | 7/2004 |
| KR | 1020040076710 | 9/2004 |
| KR | 1020040077301 | 9/2004 |
| KR | 1020040102292 | 12/2004 |
| KR | 1020050117363 | 12/2005 |

* cited by examiner

TRANSMITTING AND RECEIVING SYSTEMS FOR INCREASING SERVICE COVERAGE IN ORTHOGONAL FREQUENCY DIVISION MULTIPLEXING WIRELESS LOCAL AREA NETWORK, AND METHOD THEREOF

CROSS-REFERENCE TO RELATED APPLICATION

This application claims priority to and the benefit of Korean Patent Application No. 10-2005-0120849 filed on Dec. 9, 2005, and No. 10-2006-0049871 filed on Jun. 2, 2006, in the Korean Intellectual Property Office, the entire contents of which are incorporated herein by reference.

BACKGROUND OF THE INVENTION (a) Field of the Invention

The present invention relates to an orthogonal frequency division multiplexing wireless local area network (LAN) transmitting/receiving system for providing expanded service coverage, and a method thereof. More particularly, the present invention relates to a method for expanding service coverage of a wireless LAN system.

(b) Description of the Related Art

Recently, in addition to providing an Internet service in an indoor environment, wireless local area network (LAN) techniques have allowed expansion of its service providing area to a small hot spot area, and various applications using the wireless LAN have been rapidly developed.

IEEE 802.11a/b/g are standards for the wireless LAN system. IEEE 802.11b/g are defined in a 2.4 GHz band, and IEEE 802.11a is defined in a 5 GHz band. The maximum transmission speed is 11 Mbps in IEEE 802.11b, and 54 Mbps in IEEE 802.11a/g. Such a wireless LAN system uses an orthogonal frequency division multiplexing (OFDM) method. In addition, a wireless LAN system of IEEE 802.11 n is now standardized.

Figure 1:
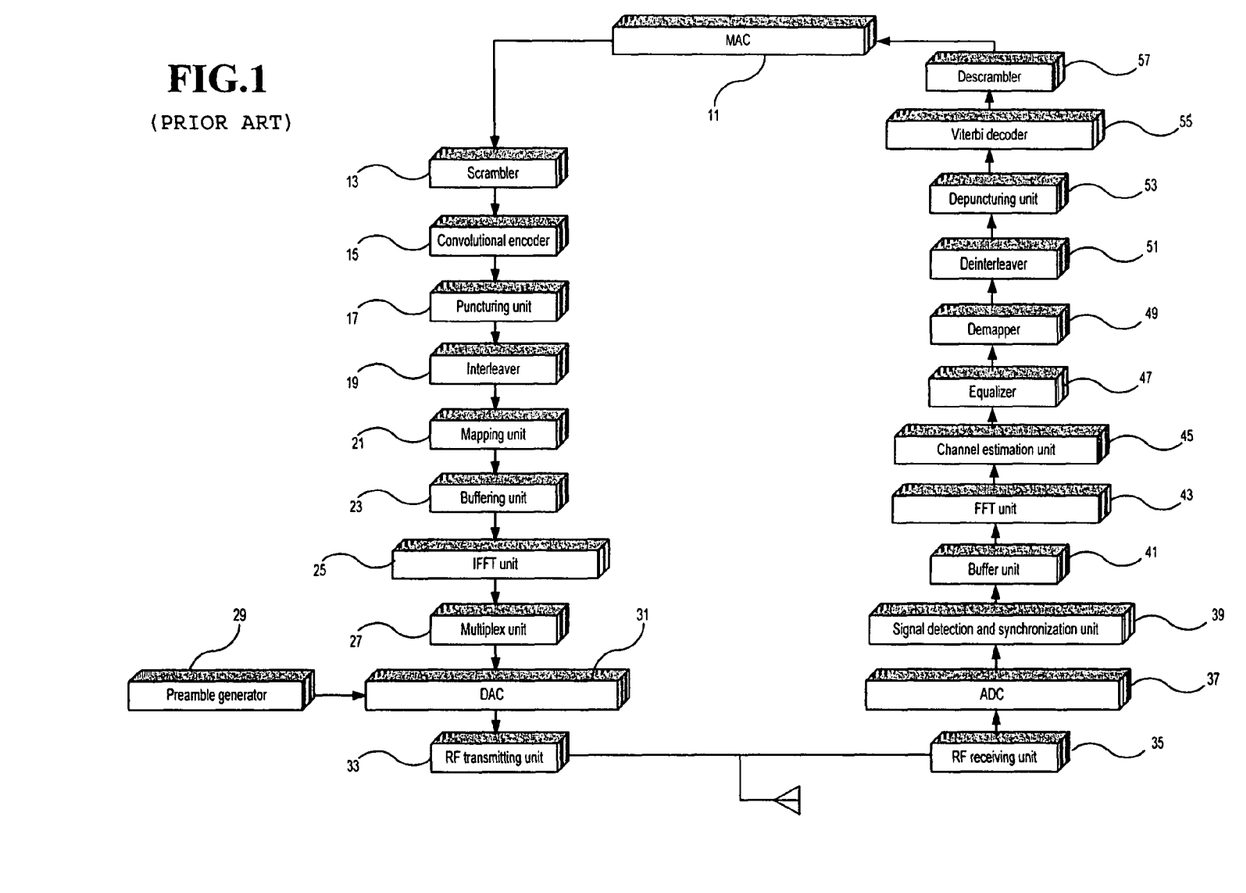
FIG. 1 shows a block diagram of a conventional wireless transmitting/receiving system.

A configuration of the wireless LAN system according to the IEEE 802.11a standard will now be described with reference to FIG. 1.

Data are transmitted from a media access control layer 11 to a convolutional encoder 15 through a scrambler 13, and the convolutional encoder 15 performs a channel encoding operation. A puncturing unit 17 controls data rates of the data, an interleaver 19 rearranges the data, and a mapping unit 21 maps the data as binary data. A buffering unit 23 stores the binary data, and an inverse fast Fourier transform (IFFT) unit 25 OFDM modulates the data. The data is transmitted to a preamble generator 29 through a multiplex unit 27, and the preamble generator 29 generates a preamble. The modulated data and the generated preamble form an entire frame. The data are modulated by a digital to analog (D/A) converter 31, are amplified to a radio frequency (RF) bandwidth by an RF transmitting unit 33, and are transmitted through an antenna.

A signal received through an antenna and attenuated to a baseband signal by a radio frequency (RF) receiving unit 35 is converted into a digital signal by an analog to digital ((A/D) converter 37. A signal detection and synchronization unit 39 detects and synchronizes time and frequency of the digital signal, and a buffer unit 41 stores the signal. A fast Fourier transform (FFT) unit 43 transforms the signal, a channel estimation unit 45 estimate a channel, and an equalizer 47 equalizes the channel. A demapper 49 converts the signal into binary data and soft-decision data. A deinterleaver 51, a depuncturing unit 53, a Viterbi decoder 55, and a descrambler 57 respectively performs inverse-processes of the transmitter (i.e., deinterleaving, depuncturing, Viterbi decoding, and descrambling processes)

Figure 2:
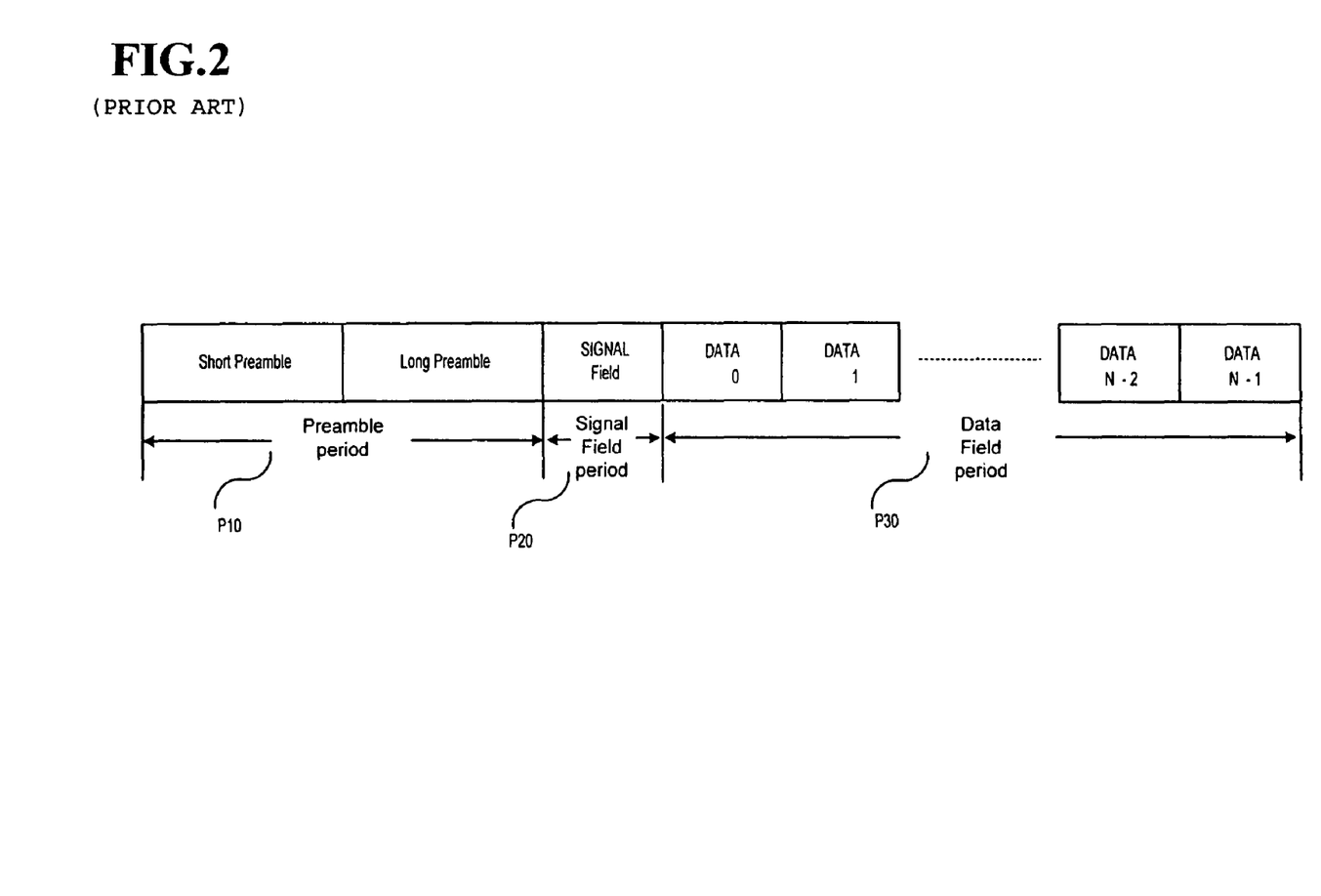
FIG. 2 shows a diagram of a frame of a conventional wireless local area network (LAN) configuration.

In this case, a configuration of a wireless LAN frame includes a preamble period P10, a signal field period P20, and data field period P30, as shown in FIG. 2.

Here, the preamble period P10 includes a short preamble and a long preamble.

The short preamble is used for performing frame synchronization and coarse frequency synchronization after performing signal detection and automatic gain control.

The long preamble is used for performing fine frequency synchronization and channel estimation of each subcarrier.

A signal field of the signal field period P20 has transmission mode information (i.e., modulation method and code rate information) and frame length information.

Accordingly, the signal field is firstly demodulated to extract the transmission mode and frame length information, and a data field of the data field P30 is demodulated based on the extracted transmission mode and frame length information to obtain receiving data.

Since the demand for wideband for a voice over Internet protocol (VoIP) service using the wireless LAN has increased, studies for increasing a service area (i.e., coverage for the conventional wireless LAN system) have been actively pursued.

However, since the wireless LAN system problematically has narrow service coverage, the service radius in a wireless LAN of IEEE 802.11a/g is approximately 100 m.

In addition, the service coverage is limited since the transmission output is low, and therefore the service radius may be increased when a high gain amplifier and a high gain antenna and sector are used.

However, this may increase the system manufacturing cost, and power consumption in a portable terminal may be increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a transmitting/receiving system of a wireless local area network (WLAN) having high receiving sensitivity and wider coverage, and a method thereof.

The present invention has been made in an effort to provide a transmitting/receiving system of a WLAN for providing compatibility with a conventional system, and a method thereof.

An exemplary transmitting system of an orthogonal frequency division multiplexing (OFDM) wireless local area network (LAN) according to an embodiment of the present invention includes an OFDM modulation controller, a frame generation controller, a buffer unit, and an OFDM modulation unit. The OFDM modulation controller controls first OFDM modulation for an even-numbered time, and controls second OFDM modulation by changing subcarrier allocation positions of first OFDM modulated symbols for an odd-numbered time. The frame generation controller controls generation of a frame having a plurality of signal fields generated according to the first OFDM modulation and the second OFDM modulation. The buffer unit stores input data that are first OFDM modulated and second OFDM modulated according to a control operation of the OFDM modulation controller. The OFDM modulation unit repeatedly modulates the first and second OFDM modulated data stored in the buffer unit, forms the repeatedly modulated OFDM symbol as a frame according to a control operation of the frame generation controller, and transmits the frame.

An exemplary transmitting system of an OFDM wireless LAN according to another embodiment of the present invention includes a first OFDM modulation controller, a second OFDM modulation controller, a frame generation controller, a buffer unit, and an OFDM modulation unit. The first OFDM modulation controller controls first OFDM modulation for an even-numbered time. The second OFDM modulation controller controls second OFDM modulation performed by cyclically moving a subcarrier allocation position of each first OFDM symbol by ½ of the first OFDM symbol, for an odd-numbered time. The frame generation controller controls generation of a frame having a plurality of signal fields generated according to the first OFDM modulation and the second OFDM modulation. The buffer unit stores input data that are respectively first OFDM modulated and second OFDM modulated according to control operations of the first and second OFDM modulation controllers. The OFDM modulation unit repeatedly modulates the first and second OFDM modulated data, and forms the repeatedly modulated OFDM symbol as a frame according to a control operation of the frame generation controller.

An exemplary receiving system of an OFDM wireless LAN according to an embodiment of the present invention includes an OFDM demodulation controller, an equalizer, and an OFDM modulation unit. The OFDM demodulation controller determines whether OFDM symbol modulation is repeated in a format configuration of a received frame, and controls a demodulation mode according to a determined result. The equalizer performs an equalization operation according to the demodulation mode. The OFDM modulation unit demodulates a signal field of the received frame according to the demodulation mode, and demodulates a data field by using the demodulated signal field.

In an exemplary transmitting method of an OFDM wireless LAN according to an embodiment of the present invention, a) a signal field according to a first OFDM modulation is generated for an even-numbered time, b) a signal field according to a second OFDM modulation performed by changing subcarrier allocation position of a first OFDM modulated symbol is generated for an odd-numbered time, and c) a transmitting frame having a plurality of signal fields generated in a) and b) is transmitted.

In an exemplary transmitting method of an OFDM wireless LAN according to another embodiment of the present invention, a) a signal field is generated by using first bit allocation information according to first OFDM modulation for an even-numbered time, b) a signal field is generated by using second bit allocation information according to second OFDM modulation performed by cyclically moving each subcarrier position of first OFDM modulated symbols by ½ of a fast Fourier transform (FFT) point, for an odd-numbered time, and c) a transmitting frame having a plurality of signal fields generated in a) and b) is transmitted.

In an exemplary receiving method of an OFDM wireless LAN according to an embodiment of the present invention, a) a format configuration of a received frame is determined to determine whether a signal field of the frame is repeatedly generated, b) a demodulation mode is selected according to a result determined in a), c) a frame in which the signal field is not repeatedly generated is demodulated according to the selected demodulation mode, and d) a frame in which the signal field is repeatedly generated is demodulated according to the selected demodulation mode.

DETAILED DESCRIPTION OF THE EMBODIMENTS

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Throughout this specification and the claims which follow, unless explicitly described to the contrary, the word "comprise" and variations such as "comprises" or "comprising" will be understood to imply the inclusion of stated elements but not the exclusion of any other elements.

In addition, the word "module" will be understood to indicate a unit for processing a predetermined function or operation, which may be realized by hardware, software, or a combination thereof.

An orthogonal frequency division multiplexing (OFDM) wireless local area network (LAN) transmitting/receiving system for providing expanded service coverage according to an exemplary embodiment of the present invention, and a method thereof, will now be described with reference to the figures.

Figure 3:
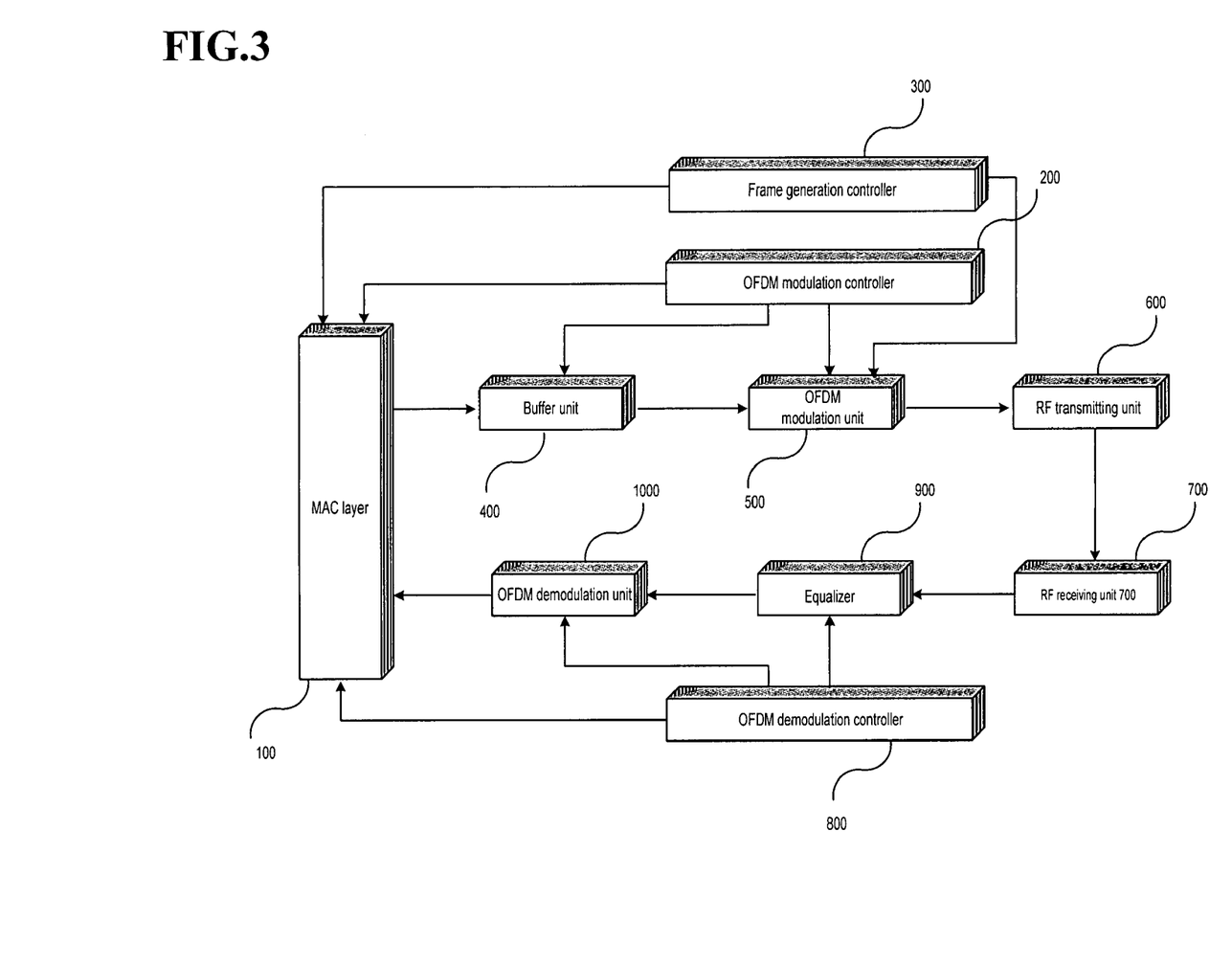
FIG. 3 shows a block diagram of a wireless LAN transmitting/receiving system according to an exemplary embodiment of the present invention.

FIG. 3 shows a block diagram of a wireless LAN transmitting/receiving system according to the exemplary embodiment of the present invention. The wireless LAN transmitting/receiving system is based on OFDM-based IEEE 802.11a/g standards, and it may be applied to the wireless LAN system according to an IEEE 802.11n standard or IEEE standards to be further provided.

As shown in FIG. 3, the wireless LAN transmitting/receiving system includes a media access control (MAC) layer 100, an OFDM modulation controller 200, a frame generation controller 300, a buffer unit 400, an OFDM modulation unit 500, a radio frequency (RF) transmitting unit 600, an RF receiving unit 700, an OFDM demodulation controller 800, an equalizer 900, and an OFDM demodulation unit 1000.

The OFDM modulation controller 200, the frame generation controller 300, the buffer unit 400, the OFDM modulation unit 500, and the RF transmitting unit 600 form a transmitting system, and the RF receiving unit 700, the OFDM demodulation controller 800, the equalizer 900, and the OFDM demodulation unit 1000 form a receiving system.

The media access control layer 100 generates a signal field according to a control operation of the frame generation controller 300.

The OFDM modulation controller 200 differently allocates a subcarrier to control modulating the OFDM symbol.

The frame generation controller 300 controls generation of a frame including a signal field repeatedly generated according to the OFDM symbol modulation in control of the OFDM modulation controller 200. Here, sequential OFDM symbols are repeated to perform the OFDM symbol modulation, and the subcarrier is differently allocated to the same signal to achieve a diversity effect.

The buffer unit 400 stores input data including repeated OFDM symbols according to a control operation of the OFDM modulation controller 200. That is, mapped symbols are OFDM modulated to be input to an inverse Fast Fourier transform unit, and the OFDM symbol that is cyclically repeated for a subsequent time is input.

According to the control operation of the OFDM modulation controller 200, the OFDM modulation unit 500 repeatedly modulates the OFDM symbols input from the buffer unit 400, forms the OFDM symbols as a transmission frame, and transmits the transmission frame.

Here, the OFDM modulation unit 500 may further include a multiplexer MUX (not shown) for generating the transmission frame by using the signal field generated according to a control operation of the frame generation controller 300, and the OFDM symbol is modulated according to control operations of the OFDM symbol controller 200 and an inverse fast Fourier transform unit for performing first and second OFDM modulations according to the control operation of the OFDM symbol controller 200.

The OFDM demodulation controller 800 determines whether a received frame includes repeatedly modulated OFDM symbols, and controls an operation of a demodulation mode according to a determination result.

The equalizer 900 performs an equalization operation for each demodulation mode according to the determination result on whether the received frame includes the repeatedly modulated OFDM symbols, according to a control operation of the OFDM demodulation controller 800. In this case, the respective OFDM symbols of the received frame including the repeatedly modulated OFDM symbols may be detected by using a maximal ratio combining method.

The OFDM demodulation unit 1000 demodulates the signal field of the received frame for each demodulation mode determined according to whether the received frame includes the repeatedly modulated OFDM symbols, according to the control operation of the OFDM demodulation controller 800.

Figure 4:
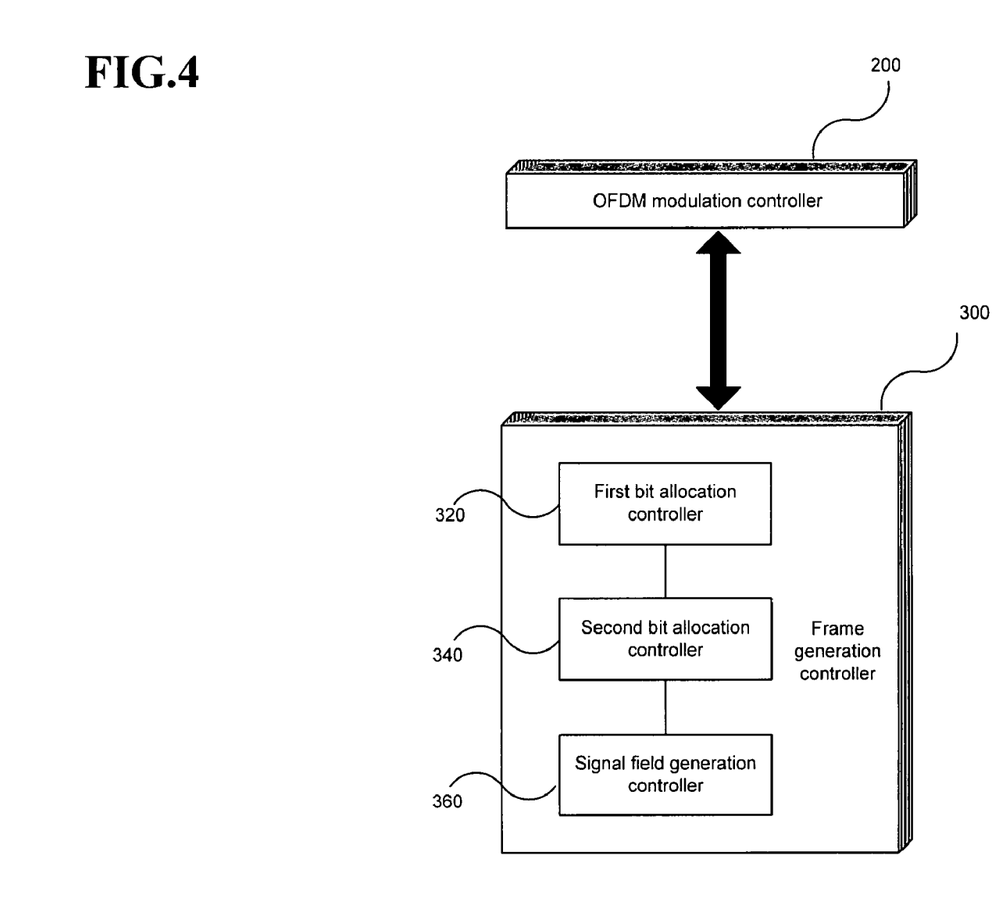
FIG. 4 shows a detailed block diagram of a configuration of an OFDM modulation controller and a frame generation controller shown in FIG. 3.

FIG. 4 shows a detailed block diagram of a configuration of the OFDM modulation controller 200 and the frame generation controller 300 shown in FIG. 3.

Referring to FIG. 4, the OFDM modulation controller 200 controls the first OFDM modulation, and the second OFDM modulation for changing subcarrier allocating positions of the first OFDM modulated OFDM symbols. In this case, the first OFDM modulation is performed for an even-numbered time. The second OFDM modulation is performed for an odd-numbered time.

Here, the OFDM modulation controller 200 may separately include a first OFDM modulation controller (not shown) and a second OFDM modulation controller (not shown).

In this case, the first OFDM modulation controller performs the first OFDM modulation for the even-numbered time.

The second OFDM modulation controller performs the second OFDM modulation by cyclically moving a subcarrier allocation position by ½ of the first OFDM modulated symbol based on an FFT point, so as to perform the second OFDM modulation. The second OFDM symbol modulation will be later described in further detail with reference to FIG. 6.

The frame generation controller 300 controls generation of a frame including a plurality of signal fields generated according to the first OFDM modulation and the second OFDM modulation. The frame generation controller 300 includes a first bit allocation controller 320, a second bit allocation controller 340, and a signal field generation controller 360.

The first bit allocation controller 320 controls bit allocation based on bit allocation information according to the first OFDM modulation.

The second bit allocation controller 340 controls the bit allocation based on bit allocation information according to the second OFDM modulation. At this time, the bit allocation is controlled by a ½ value of the bit allocation information allocated by the first bit allocation controller 320.

The signal field generation controller 360 controls generation of the plurality of signal fields according to each bit allocation performed by the first bit allocation controller 320 and the second bit allocation controller 340.

Figure 5:
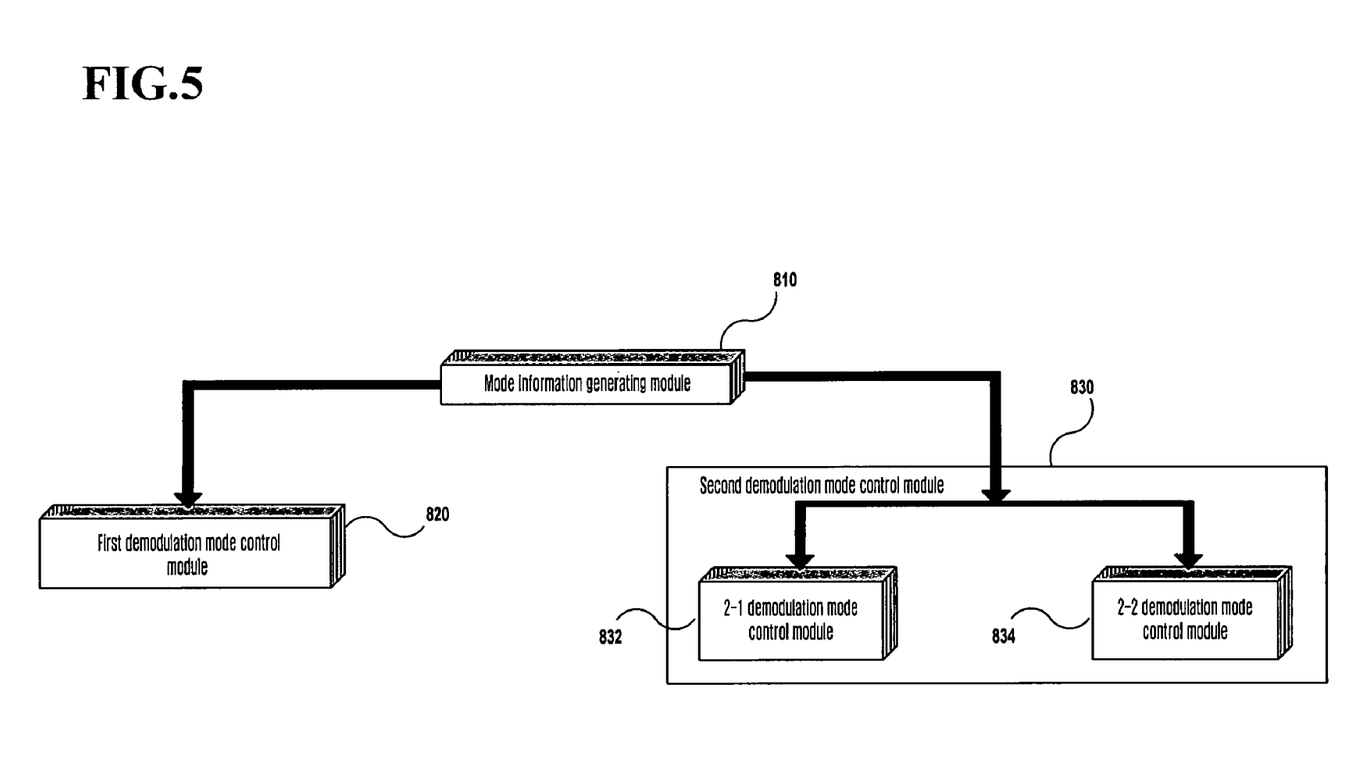
FIG. 5 shows a detailed diagram of an OFDM demodulation controller shown in FIG. 3.

FIG. 5 shows a detailed diagram of the OFDM demodulation controller 800 shown in FIG. 3.

As shown in FIG. 5, the OFDM demodulation controller 800 includes a mode information generating module 810, a first demodulation mode control module 820, and a second demodulation mode control module 830.

The mode information generating module 810 generates demodulation mode information according to the determined result on whether the received frame includes the repeated signal fields.

The first demodulation mode control module 820 controls a demodulation mode operation of the received frame by using the demodulation mode information of the mode information generating module 810 when the signal field is not repeatedly generated in the received frame.

The second demodulation mode control module 830 controls the demodulation operation of the received frame having the repeated signal field by using the demodulation mode information of the mode information generating module 810. In this case, the second demodulation mode control module 830 demodulates the signal field by using first and second bit allocation information. Data fields are demodulated according to each signal field.

The second bit allocation information is obtained by cyclically moving the FFT point of the subcarrier allocation by ½ of the OFDM symbol (i.e., a value of the second bit allocation information is half of that of the first bit allocation information).

The second demodulation mode control module 830 may further include a 2-1 demodulation mode control module 832, and a 2-2 demodulation mode control module 834.

The 2-1 demodulation mode control module 832 controls a demodulation operation of the data field by using one demodulated signal filed when the one signal field is successfully demodulated. The data field demodulation may be controlled by demodulating the signal field once more after the one signal field is demodulated.

The 2-2 demodulation mode control module 834 controls the data field demodulation according to the repetitive signal field demodulation when the one signal field fails to be demodulated.

Figure 6:
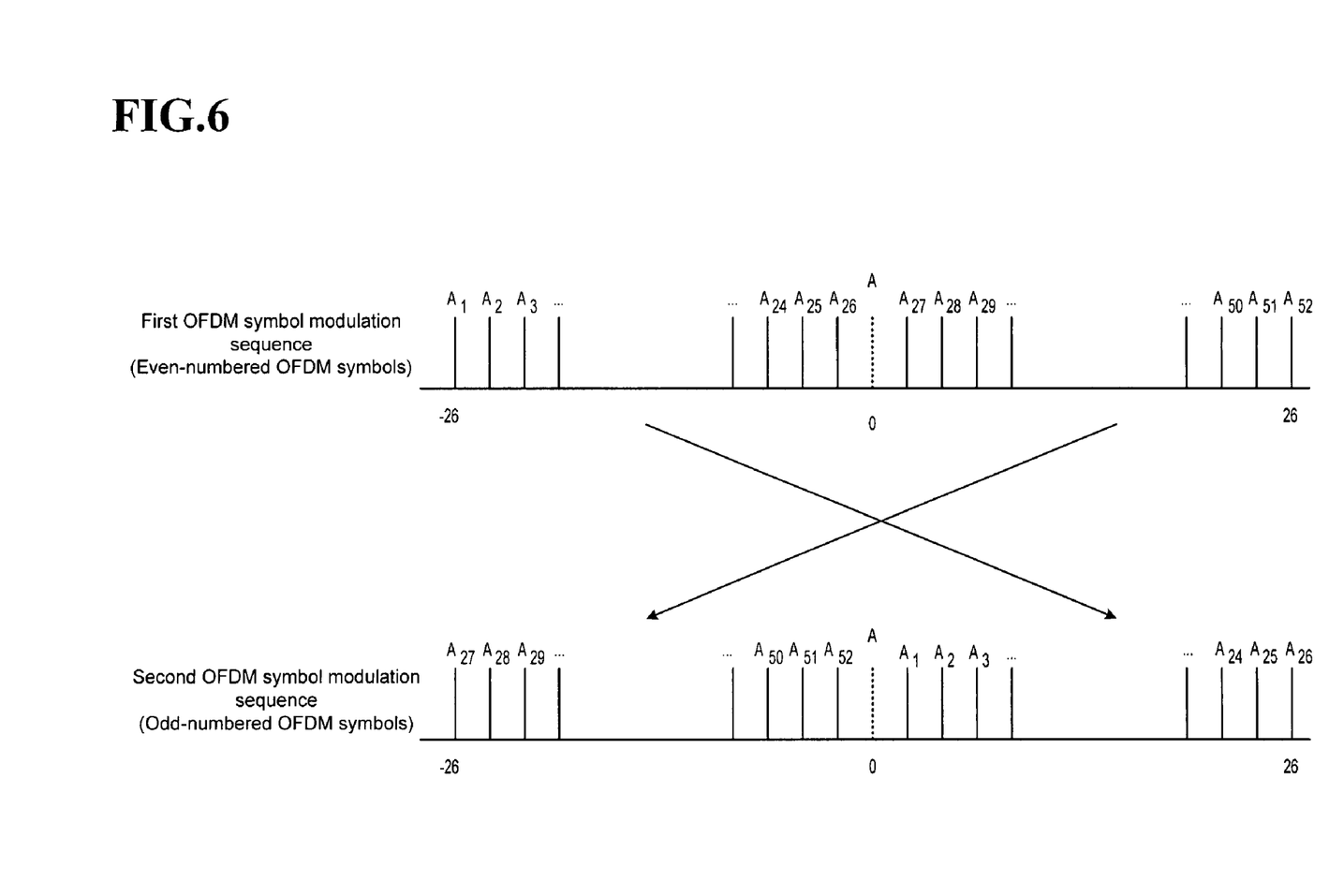
FIG. 6 shows a diagram representing repeated OFDM symbols of the wireless LAN transmitting system according to the exemplary embodiment of the present invention.

FIG. 6 shows a diagram representing the repeated OFDM symbols of the wireless LAN transmitting system according to the exemplary embodiment of the present invention.

In FIG. 6, the OFDM symbols are repeated to expand the coverage of the wireless LAN.

In this case, since not only the OFDM symbol is repeated but also the FFT point (N) is cyclically moved by ½ of the OFDM modulated symbol when allocating the subcarrier of the two repeated symbols, the diversity effect may be obtained.

A process for repeating the OFDM symbol will be described in further detail. Firstly, an input OFDM symbol is transmitted for the even-numbered time to form a first OFDM symbol modulation sequence. Then, the OFDM symbol transmitted during the even-numbered time is repeated, and a subcarrier location is circulated by ½ of the FFT point to transmit the OFDM symbol, which forms a second OFDM symbol modulation sequence. Accordingly, a total data rate is reduced by half.

That is, data A1 to A52 and a pilot symbol are allocated to subcarriers −26 to −1 and 1 to 26. Subsequently, in the next repeated OFDM symbol, data A27 to A52 are allocated to subcarriers −26 to −1, and data A1 to A26 are allocated to subcarriers 1 to 26.

The first and second OFDM symbol modulation sequences are allocated to the subcarrier and are transmitted, and a receiving terminal performs a maximal ratio combining operation to detect the first and second OFDM symbol modulation sequences.

Accordingly, since a signal to noise ratio (SNR) of 3 dB due to the repetition of the OFDM symbol and a diversity effect due to the subcarrier allocation may be achieved, the transmission speed may be reduced by half, but a service radius may be increased to 50% to 100%.

Figure 7:
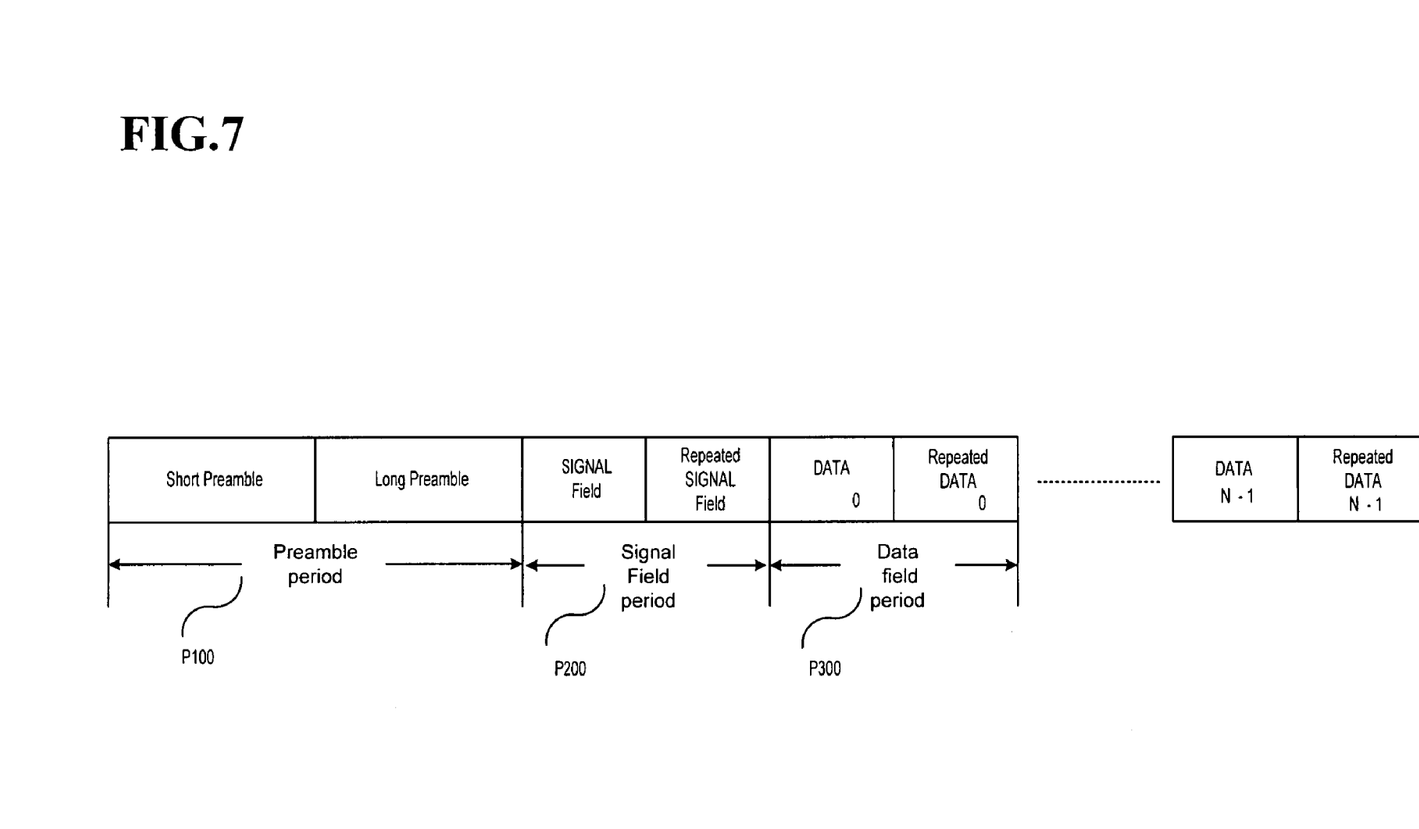
FIG. 7 shows a diagram of a wireless local area network (LAN) frame configuration according to the exemplary embodiment of the present invention.

FIG. 7 shows a diagram of a wireless local area network (LAN) frame configuration according to the exemplary embodiment of the present invention.

As shown in FIG. 7, the wireless LAN frame configuration includes a preamble period P100, a signal field period P200, and a data field period P300.

A configuration of the preamble period P100 is the same as that of the conventional wireless LAN frame shown in FIG. 2. However, the signal field period P200 and the data field period P300 are repeated. In the signal field period P200, the signal field is repeated. When the signal field is not repeated, since receiving sensitivity of the data field is improved but the receiving sensitivity of the signal field is not improved, the coverage may not be increased.

Here, data rate information of the signal field (i.e., a modulation method and a code rate) is given as in Table 1.

TABLE 1

| RATE (Mbps) | R1-R4 | New RATE (Mbps) | R1-R4 |
|---|---|---|---|
| 6 | 1101 | 3 | 1100 |
| 9 | 1111 | 4.5 | 1110 |
| 12 | 0101 | 6 | 0100 |
| 18 | 0111 | 9 | 0110 |
| 24 | 1001 | 12 | 1000 |
| 36 | 1011 | 18 | 1010 |
| 48 | 0001 | 24 | 0000 |
| 54 | 0011 | 27 | 0010 |

A rate RATE on the left side of Table 1 corresponds to the first bit allocation information of the second demodulation mode control module 830, and a rate New RATE on the right side of Table 1 corresponds to the second bit allocation information of the second demodulation mode control module 830.

Here 6, 9, 12, 18, 24, 36, 48, and 54 (Mbps) modes corresponding to the rate on the left side of Table 1 correspond to the conventional bit allocation information.

3, 4.5, 6, 9, 12, 18, 24, and 27 (Mbps) modes of the rate New RATE, the same bits as the bits of the rate RATE, are allocated to R1 to R3, and 0 is allocated on R4.

Since the bit allocation is newly defined, compatibility with the conventional system may be provided.

The compatibility with the conventional system will now be described.

That is, when receiving the frame having the format configuration shown in FIG. 7 and obtaining the SNR for demodulating the frame, the conventional wireless LAN system demodulates the signal field. However, at this time, the conventional system does not process the received frame since bit allocation information that is not used in the conventional system is provided, and it waits until the frame is completely received. Since the signal field is not demodulated when receiving power is low, subsequent data may not be demodulated.

Accordingly, the frame configuration shown in FIG. 7 may not affect the operation of the conventional wireless LAN system, that is, it may be compatible with the conventional system.

Figure 8:
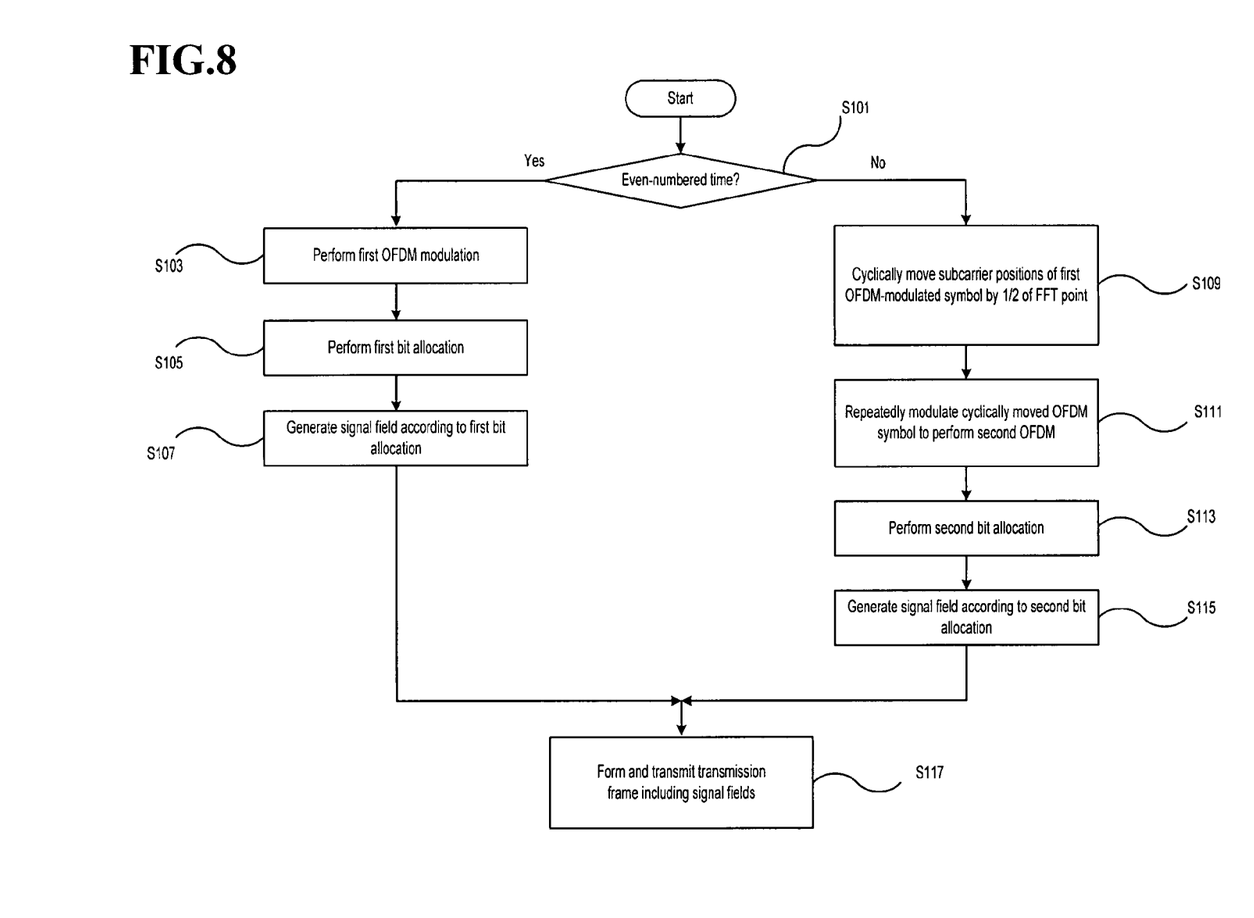
FIG. 8 shows a diagram representing a transmission method of the wireless LAN transmission system according to the exemplary embodiment of the present invention.

FIG. 8 shows a diagram representing a transmission method of the wireless LAN transmission system according to the exemplary embodiment of the present invention.

As shown in FIG. 8, it is determined in step S101 whether it is an even-numbered time, and the first OFDM modulation is performed for the even-numbered time in step S103.

The first bit allocation according to the first OFDM modulation is performed in step S105.

The signal field according to the first bit allocation is generated in step S107.

When it is determined in step S101 that it is an odd-numbered time, the second OFDM modulation is performed for the odd-numbered time in steps S109 and S111. Here, the second OFDM modulation is performed by changing subcarrier allocation positions of the symbol that is first OFDM modulated. In further detail, the second OFDM modulation is performed by cyclically moving the subcarrier positions of the first OFDM-modulated symbol by ½ of the FFT point.

The second bit allocation according to the first OFDM modulation is performed in step S113.

The signal field according to the second bit allocation is generated in step S115.

A transmission frame including the plurality of signal fields generated in steps S107 and S115 is formed and transmitted in step S117.

Figure 9:
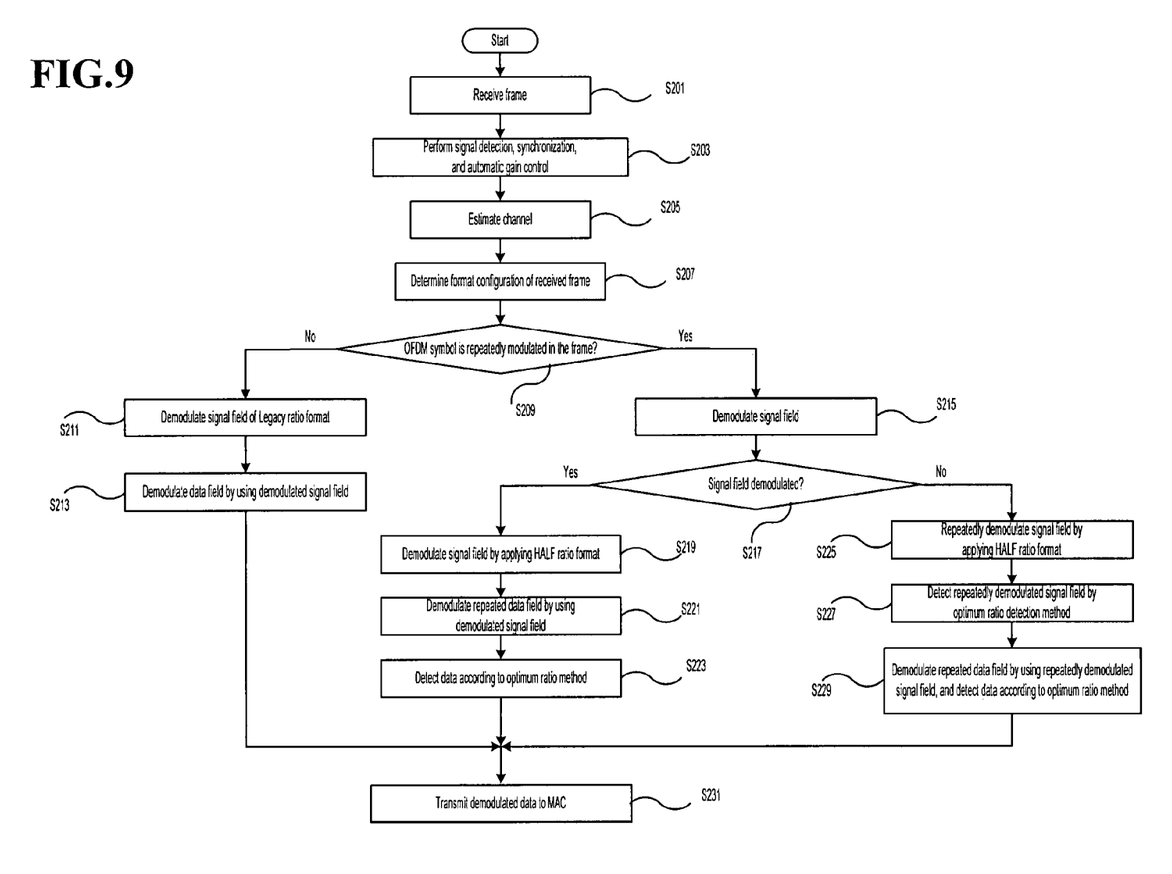
FIG. 9 shows a diagram representing a receiving method of the wireless LAN receiving system according to the exemplary embodiment of the present invention.

FIG. 9 shows a diagram representing a receiving method of the wireless LAN receiving system according to the exemplary embodiment of the present invention.

As shown in FIG. 9, signal detection, synchronization, and automatic gain control are performed in step S203 for a frame received in step S201, and a channel is estimated in step S205.

A format configuration of the received frame is determined in step S207. A demodulation mode of the frame in which the signal field is not repeated, or a demodulation mode of the frame in which the signal field is repeated, is selected according to a determined result in step S207.

That is, according to the determined result in step S207, when it is determined in step S209 that the OFDM symbol is not repeatedly modulated in the frame, the signal field is demodulated in step S211, and the data field is demodulated in step S213 by using the demodulated signal field. That is, the demodulation is performed by using a Legacy ratio format which is the rate RATE on the left side of Table 1, and the data is transmitted to the MAC 100 in step S231.

According to the determined result in step S207, when it is determined in step S209 that the signal field is repeatedly generated in the frame (i.e., the OFDM symbol is repeatedly modulated), the signal field is demodulated in step S215.

It is determined in step S215 whether the signal field is successfully demodulated. In this case, two demodulation methods may be performed according to the determined result in step S215.

That is, the signal field is successfully demodulated when the demodulation is performed by one single signal field, and the signal field is demodulated in step S219 by using a ratio format which is the rate NEW RATE on the right side of Table 1. In this case, the subsequent repeated signal field is ignored, the data field is demodulated in an optimum ratio method, and the data are transmitted to the MAC 100 in steps S221, S223, and S231.

To determine the signal field again, demodulation of two signal fields (a first signal field and a second signal field) is performed, and the data field is demodulated by using the demodulated signal fields.

When a failure to demodulate the signal field occurs (i.e., the demodulation may not be performed by one single signal field), the repeated signal field is demodulated in step S225 by using the ratio format which is the rate NEW RATE on the right side of Table 1.

The signal field is demodulated in an optimum ratio detection method, the data field is demodulated by using the demodulated signal field, and the demodulated data field is transmitted to the MAC 100 in steps S227, S229, and S231.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, service coverage may be increased while maintaining compatibility with the conventional wireless LAN system Compared to using a high power amplifier or a high gain sector antenna, a method for transmitting a signal by repeatedly modulating the signal according to the exemplary embodiment of the preset invention has a cost reduction effect, and further, when the method according to the exemplary embodiment and the high power amplifier or the high gain sector antenna are used together, the cost reduction effect is further improved.

What is claimed is:

1. A transmitting system of an orthogonal frequency division multiplexing (OFDM) wireless local area network (LAN), the transmitting system comprising:
   an OFDM modulation controller for controlling first OFDM modulation for an even-numbered time, and controlling second OFDM modulation by changing subcarrier allocation positions of first OFDM modulated symbols for an odd-numbered time;
   a frame generation controller for controlling generation of a frame having a plurality of signal fields generated according to the first OFDM modulation and the second OFDM modulation;
   a buffer unit for storing input data that are first OFDM modulated and second OFDM modulated according to a control operation of the OFDM modulation controller; and
   an OFDM modulation unit for repeatedly modulating the first and second OFDM modulated data stored in the buffer unit, forming the repeatedly modulated OFDM symbol as a frame according to a control operation of the frame generation controller, and transmitting the frame,
   wherein a bit allocation according to the first OFDM modulation is different from a bit allocation according to the second OFDM modulation.

2. The transmitting system of claim 1, wherein the frame generation controller comprises:
   a first bit allocation controller for controlling bit allocation according to the first OFDM modulation;
   a second bit allocation controller for controlling bit allocation according to the second OFDM modulation; and
   a signal field generation controller for controlling generation of a plurality of signal fields according to information of the bit allocation performed by the first bit allocation controller and the second bit allocation controller.

3. A transmitting system of an orthogonal frequency division multiplexing (OFDM) wireless local area network (LAN), the transmission system comprising:
   a first OFDM modulation controller for controlling first OFDM modulation for an even-numbered time;
   a second OFDM modulation controller for controlling second OFDM modulation performed by cyclically moving a subcarrier allocation position of each first OFDM symbol by ½ of the first OFDM symbol with reference to an FFT point for an odd-numbered time;
   a frame generation controller for controlling generation of a frame having a plurality of signal fields generated according to the first OFDM modulation and the second OFDM modulation;
   a buffer unit for storing input data that are respectively first OFDM modulated and second OFDM modulated according to control operations of the first and second OFDM modulation controllers; and
   an OFDM modulation unit for repeatedly modulating the first and second OFDM modulated data, and forming the repeatedly modulated OFDM symbol as a frame according to a control operation of the frame generation controller, wherein a bit allocation according to the first OFDM modulation is different from a bit allocation according to the second OFDM modulation.

4. The transmitting system of claim 3, wherein the frame generation controller comprises:
   a first bit allocation controller for controlling bit allocation according to the first OFDM modulation;
   a second bit allocation controller for controlling the bit allocation by ½ of bits allocated by the first bit allocation controller, according to the second OFDM modulation; and
   a signal field generation controller for controlling generation of a plurality of signal fields according to information of the bit allocation respectively performed by the first bit allocation controller and the second bit allocation controller.

5. A transmitting method of an orthogonal frequency division multiplexing (OFDM) wireless local area network (LAN), the transmitting method comprising:
   a) generating a signal field according to a first OFDM modulation for an even-numbered time;
   b) generating a signal field according to a second OFDM modulation for an odd-numbered time, the second OFDM modulation performed by changing subcarrier allocation position of a first OFDM modulated symbol; and
   c) transmitting a transmitting frame having a plurality of signal fields generated in a) and b),
   wherein a bit allocation according to the first OFDM modulation is different from a bit allocation according to the second OFDM modulation.

6. The transmitting method of claim 5, wherein the signal field is generated by using bit allocation information according to the first OFDM modulation and the second OFDM modulation.

7. A transmitting method of an orthogonal frequency division multiplexing (OFDM) wireless local area network (LAN), the transmitting method comprising:
   a) generating a signal field by using first bit allocation information according to first OFDM modulation for an even-numbered time;
   b) generating a signal field by using second bit allocation information according to second OFDM modulation for an odd-numbered time, the second OFDM modulation performed by cyclically moving each subcarrier position of first OFDM modulated symbols by ½ of a fast Fourier transform (FFT) point; and
   c) transmitting a transmitting frame having a plurality of signal fields generated in a) and b),
   wherein a bit allocation according to the first OFDM modulation is different from a bit allocation according to the second OFDM modulation.

8. The transmitting method of claim 7, wherein, in b), the signal field is generated by using the second bit allocation information having a ½ value of the first bit allocation information.

* * * * *